Patented Apr. 16, 1929.

1,709,460

UNITED STATES PATENT OFFICE.

CHARLES H. CASEAU, OF NEW YORK, N. Y.

SHAVING CREAM AND PROCESS OF MAKING SAME.

No Drawing.   Application filed May 17, 1927. Serial No. 192,162.

This invention relates to a shaving cream and to a process of making the same.

The general object of the invention is to provide a shaving cream of the so-called latherless type, which depends for its efficiency, not on softening the beard or other hair to be shaved off, but on supporting the individual hairs so that they will remain standing until cut off by the razor instead of bending over and allowing the razor to slip over them or cut them at a slant.

A further object of the invention is to provide a latherless shaving cream which can be used regularly for long periods without injury to the skin, thereby avoiding the necessity of applying lotions to the skin after shaving.

Another object of the invention is to provide a latherless shaving cream which can be used without preliminary preparation of the face, such as wetting or washing it.

A still further object of the invention is to provide a latherless shaving cream which has the properties of a so-called "rub-out" massage cream, so that after the shave, it is unnecessary to wash off any remaining shaving cream, as a light massage will quickly clear the skin of any remaining cream and incidently clear the pores of the skin of any impurities.

Further objects of the invention are to accomplish the desired results without the use of any ingredients which will make the cream greasy or sticky or injuriously affect its keeping qualities.

A final important object is to provide a latherless shaving cream which will remain of substantially the same consistency under the climatic conditions which it is intended to encounter, and which will not be injured by keeping under usual conditions for a considerable time.

The latherless shaving cream embodying the present invention supports the individual hairs, not merely by filling up the spaces between the hairs with material which will tend to hold them erect, but largely by forming a relatively stiff coating on each hair, which coating, while tending to hold the hair erect, is readily cut by the razor. In this shaving cream the principal ingredients are swollen starch and a mixture comprising a plurality of hydrocarbons, such mixture of hydrocarbons having a viscosity about like a cold cream.

For cooler climates the mixture of hydrocarbons known to pharmacists as petrolatum has about the proper viscosity for the present invention, although for tropical climates a mixture of higher viscosity is advantageous. By combining a mixture of hydrocarbons having a melting point about 120° to 130° F., that is to say, solid at ordinary room temperatures, with a hydrocarbon or mixture of hydrocarbons fluid at or below the freezing point, the desired viscosity of the mixture may be obtained by suitably adjusting the proportions of the ingredients of the mixture. In ordinary practice I may employ a mixture comprising the hydrocarbons usually known and sold as paraffine, which is solid at ordinary temperatures, with a material known and sold as mineral oil, which is a mixture of hydrocarbons liquid at temperatures considerably below the freezing point.

The proportions of the ingredients may be varied as required to obtain the desired viscosity. Usually the amount of the solid, or paraffine, should be about 7 to 9 times that of the mineral oil. To make the mixture it will be advisable to melt the paraffine, for example, over a water bath or otherwise, and add the mineral oil slowly to the paraffine while the latter is still in the melted condition.

While the swollen starch may be obtained by various methods from ordinary commercial starch, it is particularly advantageous to prepare it by cooking the starch, for example, over a water bath. It is cooked until it has become thick and rather hard to stir but it is important to remove it from the water bath before it has reached the limit of swelling or become "cakey". In practice it has been found that the starch and water mixed in the proportions of 15 to 30 parts by weight of water to about 3 parts by weight of ordinary commercial starch and then heated to about the boiling point will give a satisfactory swollen starch suitable for carrying out the present invention. I find, moreover, that any reasonably clean potable water will be satisfactory, though, of course, distilled water, filtered water or boiled water may be used.

The swollen starch, with its accompanying water, may be combined with the viscous mixture of hydrocarbons in various ways, for example, either cold or warm, more agitation being necessary to combine them satisfactorily when cold than when warm. The resulting product is a pasty emulsion. In order to maintain the emulsification for a long period of time, it is well to add a suitable excipient and particularly one not likely to decompose or putrefy. Of such excipients probably the best for the present purposes is a suitable soap. It will be found that a relatively small amount of a good soap, such for example as a white castile soap, is eminently satisfactory. However, in carrying out the invention in the best form, it must be kept in mind that the soap is not used to give any detergent or alkaline action, as that tends to act on the skin and beard. Hence only a small quantity of soap, just sufficient to act as an excipient, gives the best results.

It will be found advantageous to use a small amount of borax in the final product as this is an efficient mold-inhibiting agent. Furthermore, its weak alkaline action will serve to neutralize any acidity which might exist or arise later in any of the other ingredients. While the borax may be added at any desired time, it is most convenient to dissolve it in the water in which the starch is to be cooked, thereby insuring its thorough diffusion through the starchy mass.

This process provides a shaving cream which will readily support the hair so that a clean cut will be made with a razor without bending or splitting the hair. The pull of the razor is caused by the jump of the razor from hair to hair. With my cream, however, this jump action would be eliminated as the space between the hairs would be filled with a shaving cream which would be and remain stiff during shaving.

A further advantage which has been demonstrated for this cream is that it is unusually efficient as a massage cream, so that any cream remaining on the face after completing the shaving operation need not be washed off but can be rubber off from the face. Of course, it may be washed off, if desired, even with cold water, which is particularly invigorating to the skin.

It will be found advantageous to keep the quantity of soap used to the minimum, so long as the quantity used be sufficient to allow the mixture to become emulsified without being greasy or too alkaline.

A shaving cream comprising the ingredients above-mentioned either with or without the borax will be found eminently satisfactory for the purpose intended. However, it is customary to add a small amount of material having a medicinal action on the skin, as for example thymol or menthol or both, and also to add a suitable perfume.

I will now give some specific examples of shaving creams embodying the invention.

I have found the following combination to produce very satisfactory results:

3 oz. starch.
20–25 oz. water.
15–20 grs. borax.
¾ oz. white soap dissolved in 3½ oz. water.
2½–3 oz. paraffine.
⅓ oz. mineral oil.
1 dr. thymol extract solution (12 grs. in ½ oz. alcohol).
⅓ dr. menthol solution (5 grs. in 2 dr. alcohol).

The borax is first dissolved in the water and it and such water are then added to the starch in a suitable container. The starch and borax mixture are heated in any suitable manner, as over a water bath until the starch is cooked and has become thick and rather hard to stir. As stated before, it will be advantageous to remove it from the water bath before it has reached its limit of swelling or become "cakey". The soap is dissolved in the water preferably by heating in any suitable manner. The paraffine is heated over a water bath or slow fire until completely melted. The mineral oil is added to the paraffine while the latter is still in the melted condition. It will be advantageous to have the dissolved soap, and the paraffine and oil mixture (if the latter be used), all at substantially the same temperture and then to pour the soap solution into the mixture of paraffine and oil. The compound must then be stirred until thoroughly mixed.

The starch will be found to have a much better texture if it is continually stirred during the cooking operation. The melted paraffine and mineral oil, together with the dissolved soap which was added thereto, and also the thymol and menthol with the alcohol in which they were dissolved, are then poured in with the cooked starch and borax. Although these ingredients may be added in any desired order and manner, it will be found advantageous to add them in the order named, and to also continue stirring the compound until it is satisfactorily mixed, when it will be of advantage to place the entire mixture over the water bath and there heat until the cream compound has reached the desired consistency. Any perfume desired to be added should be added with the thymol and menthol, if used.

The cream compound is then permitted to cool and, after it has become cool, it is placed in suitable containers, as collapsible tubes, or jars, and sealed.

An example of a formula which will produce advantageous results under cold climatic conditions such, for example, as exist in New York city and vicinity in the winter, is as follows:

| | |
|---|---|
| Starch, | 2–4 oz. in 20 oz. water. |
| Borax, | Under 1 gr. to 2 gr. per oz. water. |
| Soap, | ½ oz. to 1½ oz. |
| Paraffine, | 1–3 oz. |
| Vaseline or Mineral oil | Sufficient to allow the whole mixture to emulsify without being too greasy or too alkaline. |

The method of compounding is the same as above described.

When it is desired to produce a cream compound having the characteristics most desirable in high temperatures, when people perspire freely, as in summer, the thickening material, as starch or paraffine, or both, may be increased and, if desired, there could be added, to decrease fluidity of the compound, a small quantity of chalk, or magnesia either in the form of a carbonate or an oxide, though such addition is not essential.

While it is not essential that the ingredients herein be used in the proportions indicated, it will generally be advantageous to use them in approximately the proportions indicated, particularly when it is desired that they should be able to meet important changes in climatic conditions.

An advantage which inheres in the use of the petroleum derivatives is that they may readily be varied in wide proportions to accord with changes of amount and character of the other constituents for any of the causes which may arise, as climatic differences, or other similar needs, without the necessity of adding embalming antiseptics, which would necessarily complicate the formula, be disadvantageous for the skin, and needlessly increase the cost of the cream.

It will be understood that the formulæ herein may be considerably varied without departing from the spirit of the invention.

It will be observed that by my process a shaving cream of a stiff consistency is produced which has the advantages; among others, of not being sticky or greasy, and of being stiff and easily seen on the face by reason of its white opaqueness, which reduces the danger of the user cutting himself.

What I claim is:

1. A toilet cream suitable as a latherless shaving cream consisting principally of swollen starch, said cream also containing water and a thick, viscous mixture of hydrocarbons.

2. A toilet cream suitable as a latherless shaving cream, comprising an emulsion consisting principally of swollen starch, said emulsion also containing water, a thick, viscous mixture of hydrocarbons and a suitable excipient.

3. A toilet cream suitable as a latherless shaving cream, comprising an emulsion consisting principally of swollen starch, said emulsion also containing water, a thick, viscous mixture of hydrocarbons and only enough soap to serve as an emulsifier.

4. A toilet cream suitable as a latherless shaving cream, comprising an emulsion consisting principally of swollen starch, said emulsion also containing water, a thick, viscous mixture of hydrocarbons, some of which are solid at normal room temperatures and others of which are liquid at such temperatures.

5. A toilet cream suitable as a latherless shaving cream, comprising an emulsion consisting principally of cooked starch, said emulsion also containing water, a thick, viscous oily material, and an excipient.

6. A toilet cream suitable as a latherless shaving cream comprising water-swollen starch and a thick, viscous mixture of hydrocarbons in the proportion of about 2 to 4 ounces of starch with 20 to 25 ounces of water, and about 2⅚ to 3⅓ ounces of a thick, viscous mixture of hydrocarbons, said water-swollen starch with its water constituting more than 70% by weight of the cream.

7. The process of producing a cream suitable as a latherless shaving cream, which consists in cooking starch and water in the proportions of about 15 to 30 parts by weight of water and about 3 parts by weight of starch until the starch has swollen, terminating the cooking before the swollen starch has become cakey and then combining with said swollen starch a thick, viscous mixture of hydrocarbons in the proportion of about 2⅚ to 3⅓ parts by weight of said hydrocarbons, and agitating until an emulsion is formed.

8. The process of producing a cream suitable as a latherless shaving cream, which consists in cooking starch and water in the proportions of about 15 to 30 parts by weight of water and about 3 parts by weight of starch until the starch has swollen, terminating the cooking before the swollen starch has become cakey and then combining with said swollen starch a thick, viscous mixture of hydrocarbons in the proportion of about 2⅚ to 3⅓ parts by weight of said hydrocarbons, then adding an excipient and agitating until an emulsion is formed.

9. A toilet cream suitable as a latherless shaving cream consisting of the following ingredients in substantially the proportions stated, viz:
Starch, 3 oz.
Water, 20–25 oz.
Borax, 15–20 grains.
Soap solution containing about 17% of soap 4¼ oz.
Paraffine, 2½–3 oz.
Mineral oil, ⅓ oz.
Medicaments, 1⅓ drams.

In testimony whereof, I have hereunto set my hand.

CHARLES H. CASEAU.